UNITED STATES PATENT OFFICE.

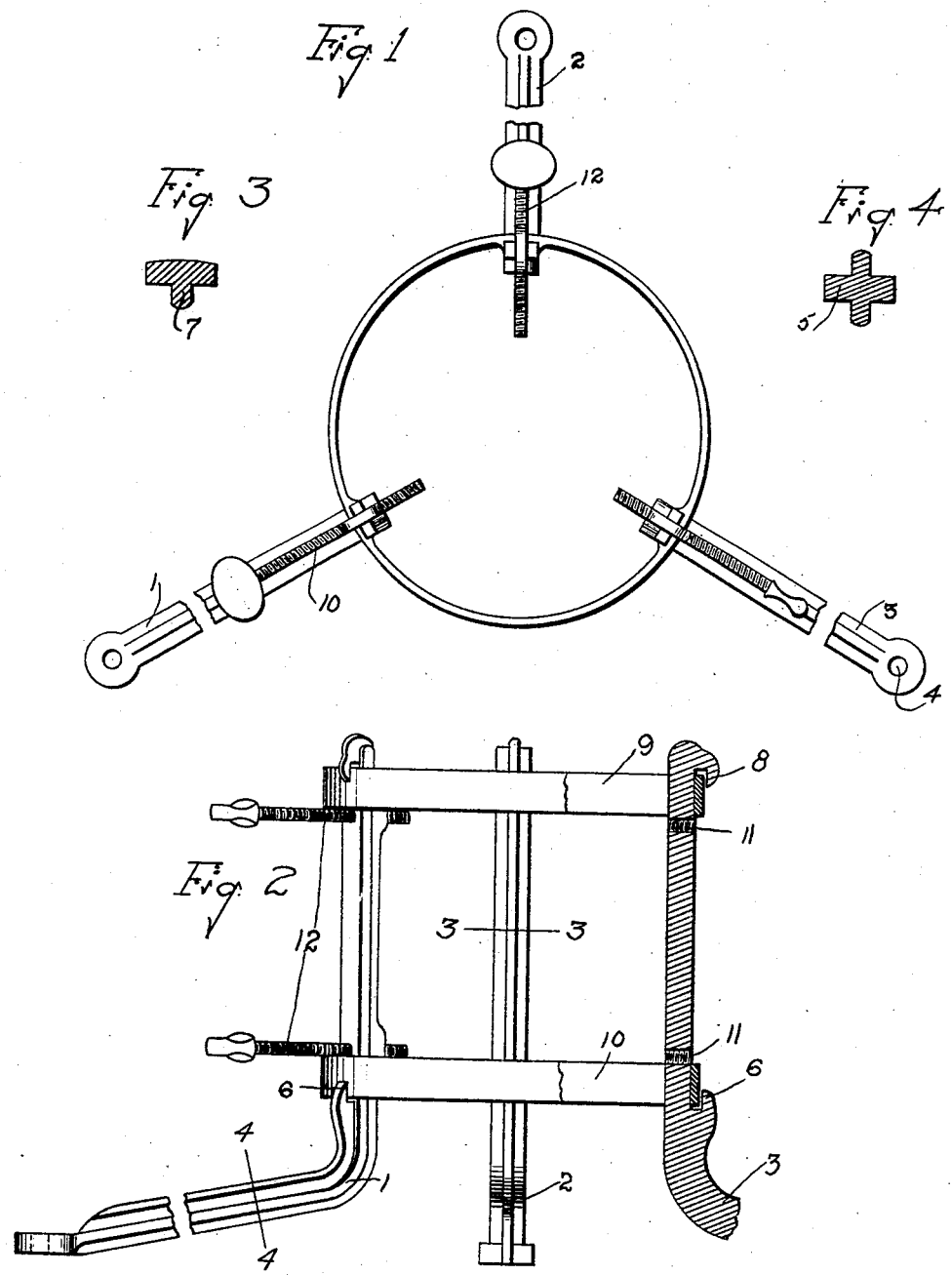

JOHN KROLL, OF PASSAIC, NEW JERSEY.

TREE-HOLDER.

1,319,009.  Specification of Letters Patent.  Patented Oct. 14, 1919.

Application filed April 25, 1919. Serial No. 292,605.

*To all whom it may concern:*

Be it known that I, JOHN KROLL, a citizen of the United States, and a resident of Passaic, in the county of Passaic and State of New Jersey, have invented a new and Improved Tree-Holder, of which the following is a full, clear, and exact description.

This invention relates to a tree holder, and aims to provide a device of this nature with the aid of which a tree which has been sawed off adjacent its roots can be placed in such holder and held upright without any danger of the same toppling over. Although this invention is particularly applicable as a tree holder, I wish it understood that the same may be used for holding upright any staff, such as a flagpole, or similar device.

Having this object in view, I desire to construct a device such as this which includes the fewest possible essential parts and, at the same time, incorporate in such parts when assembled the greatest amount of strength, so that no danger of breakage will exist.

A further object of the invention is to provide a device of this nature which may be entirely taken down so that the same may be disposed of in a comparatively small box for shipping and selling purposes.

Reference is to be had to the attached sheet of drawings which illustrates one practical embodiment of my invention, and in which—

Figure 1 is a plan view of my device;

Fig. 2 is a side elevation partly in section;

Fig. 3 is a section taken along the line 3—3 of Fig. 2; and

Fig. 4 is a section taken along the line 4—4 of Fig. 2.

In the various views similar reference numerals designate like parts, and the reference numerals 1, 2 and 3 indicate the supporting legs, which are preferably three in number, and which terminate in an enlarged end portion provided with openings, as indicated at 4, so that these legs may be firmly secured to any convenient baseboard, if desired. The lower part of each of these legs is also preferably formed of a four-ribbed bar, as indicated in Fig. 4, whereby maximum strength with minimum lightness is secured.

The uppermost of these ribs, indicated by the reference numeral 5, terminates in a recessed face on each of the legs, as indicated by the reference numeral 6. The legs 1, 2 and 3 now continue to extend upwardy, as shown in Fig. 2, it being found, however, that the fourth rib may be dispensed with, as indicated in Fig. 3, as this part of the arms is not subjected to as great a strain as the lower part. The innermost rib 7 extends upwardly to the limit of each of the legs 1, 2 and 3 and around the upper edge of the same, terminating in a hook, as indicated by the reference numeral 8.

To properly hold the legs 3 in position, there is provided a pair of rings 9 and 10, one of which is adapted to seat in the hook-shaped face 6, the other being adapted to have the hooks 8 extending around its upper edge. Screw-threaded openings 11 are formed adjacent the lower edge of the upper ring 9 and the upper edge of the lower ring 10; and positioned within such openings are hand screws 12, which in addition to retaining the rings in applied position are adapted to bear with their inner ends against the outer surface of the tree stump and firmly hold the same against any movement.

In operation it will now be appreciated that all that is necessary to assemble the various parts of this device is for the rings 9 and 10 to be moved so that the hook-shaped portions 6 and 8 overlap their upper and lower edges respectively. This position of the rings will retain the entire apparatus in applied position, but it is necessary to secure the rings in their proper position, and to do this the hand screws 12 are inserted within the screw-threaded openings 11 at points below and above the rings 9 and 10 respectively, and the device is now ready for use.

An object, such as the base of a pole, or stump of a tree, may now be inserted within the rings 9 and 10; and, if it is desired, the lower face of such object may be permitted to rest upon the surface supporting the legs 1, 2 and 3. The hand screws 12 are now tightened so as to firmly engage with their inner ends the outer surface of the object to be supported, and with the device in this position it is impossible for the pole, particularly a Christmas tree, to be overturned.

It will be understood that I may make such modifications in the construction of this device as may be desired without departing from the scope of this invention.

Having now described my invention, what I desire to claim is:

1. A holder, including a number of legs, means embracing and retaining in applied position such legs, and means projecting through such legs for holding such means in applied position and being adapted to bear with their inner ends against the object to be supported.

2. A holder, including legs, notches formed in the outer face of such legs, means extending around such legs and being adapted to project into such notches, and means projecting through such legs and engaging the outer surface of the object to be supported.

3. A holder, including supporting legs formed with screw-threaded openings extending therethrough, hook-shaped portions secured to said legs, rings extending around the outer surfaces of such legs and retaining the same in applied position, and hand screws positioned within such screw-threaded openings and directly above and below the rings.

4. A holder, including a number of legs, rings encircling such legs, adjacent the upper and lower ends thereof, and being adapted to seat within notches formed in such portions of the legs, such legs being further provided with screw-threaded openings extending through their body portion, and hand screws positioned within such openings and being adapted to bear against the outer surface of the object to be supported and retain the rings in applied position.

5. A holder, including legs, notches formed in the outer face of such legs, rings extending around such legs and being adapted to be projected into such notches, and means projecting through such legs and engaging the outer surface of the object to be supported and supporting and retaining such rings in applied position.

JOHN KROLL.

Copies of this patent may be obtained for five cents each, by addressing the "Commissioner of Patents, Washington, D. C."